United States Patent
Horita

(10) Patent No.: US 8,311,321 B2
(45) Date of Patent: Nov. 13, 2012

(54) METHOD OF AND SYSTEM FOR PREDICTING PRINT COLORS

(75) Inventor: Shuhei Horita, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 752 days.

(21) Appl. No.: 12/535,399

(22) Filed: Aug. 4, 2009

(65) Prior Publication Data

US 2010/0067783 A1 Mar. 18, 2010

(30) Foreign Application Priority Data

Sep. 16, 2008 (JP) ................................. 2008-236223

(51) Int. Cl.
*G06K 9/00* (2006.01)
*B41M 1/14* (2006.01)

(52) U.S. Cl. ........................................ 382/162; 358/1.9

(58) Field of Classification Search .................. 382/112, 382/162, 167; 101/211, 365, 484; 358/1.9, 358/3.23, 518; 356/404
See application file for complete search history.

(56) References Cited

U.S. PATENT DOCUMENTS

| | | | |
|---|---|---|---|
| 5,357,448 A * | 10/1994 | Stanford | 382/112 |
| 6,205,246 B1 * | 3/2001 | Usami | 382/167 |
| 2007/0139678 A1 * | 6/2007 | Horita | 358/1.9 |
| 2009/0027705 A1 | 1/2009 | Ozaki et al. | |

FOREIGN PATENT DOCUMENTS

| | | |
|---|---|---|
| JP | 2006-128760 A | 5/2006 |
| JP | 2007-208492 A | 8/2007 |

* cited by examiner

*Primary Examiner* — Duy M Dang
(74) *Attorney, Agent, or Firm* — Sughrue Mion, PLLC

(57) ABSTRACT

In a method of and a system for predicting print colors, a profile generator corrects the standard spectral reflectances of a color chart printed under standard density conditions and the differences between the spectral reflectances of color charts for the respective colors in which the density of one of the colors C, M, Y, K is changed to a changed density setting value and the densities of the other colors are fixed to standard density setting values, using density differences with the standard density setting values which are calculated by a monochromatic solid density calculator. The profile generator then generates a print predicting profile for desired target densities based on the corrected corrective standard spectral reflectances and the spectral reflectance differences, and highly accurately predicts the colors of a print using the print predicting profile when the densities of desired ones of the colors are changed.

19 Claims, 14 Drawing Sheets

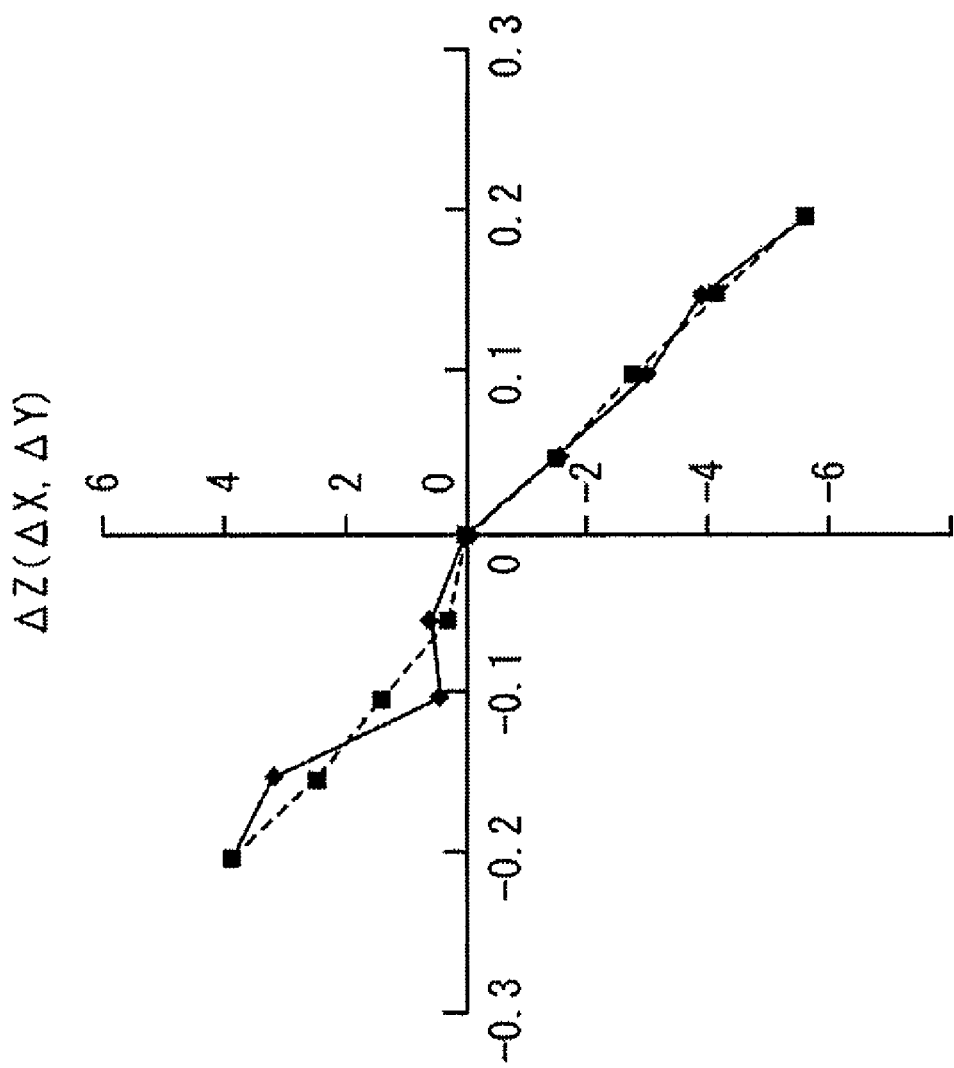

METHOD OF AND SYSTEM FOR PREDICTING PRINT COLORS

BACKGROUND OF THE INVENTION

1. Field of the Invention

The present invention relates to a method of and a system for predicting the print colors of a print produced by a printing press.

2. Description of the Related Art

Prints are produced by, for example, generating original film plates in various colors including cyan (C), magenta (M), yellow (Y), and black (K), for example, producing PS plates (presensitized plates) from the original film plates by exposure and development, mounting the PS plates on a printing press such as a rotary press or the like, and adjusting printing conditions including the ink film thickness, the dampening water, the temperature, etc.

As described above, complex steps are involved in producing prints. In order to produce a print in desired colors, it has been customary prior to the production of the print to generate a proof sheet using a simple output device such as a monitor, a color printer or the like, and adjust printing conditions in order for the proof sheet to have the desired colors of the print to be produced.

Japanese Laid-Open Patent Publication No. 2007-208492, for example, discloses a method of confirming the colors of a print before the print is produced by a printing press. According to the disclosed method, if the colors of a proof fall in an allowable range with respect to the colors of the print, then the print is produced by the printing press without changing platemaking data for generating PS plates and target densities to be set as printing conditions in the printing press. On the other hand, if the colors of the proof sheet deviate from the allowable range with respect to the colors of the print, then the platemaking data are changed or a target mixed-color halftone density or a target halftone dot area ratio which is a parameter related to the target density as the printing condition, and thereafter a proof sheet is produced again, the process being repeated until the print having the desired colors is produced.

The colors of a print are normally adjusted by the operator who adjusts the ink keys to change the solid densities of the inks, i.e., the densities of monochromatic images at a halftone dot percentage of 100%. The process of changing the densities of the proof sheet by changing the target mixed-color halftone density or the target halftone dot area ratio, and the process of changing the densities of the print using the ink keys tend to cause the operator who makes adjustments to develop different sensations about the colors. Therefore, it is possible that the print having the colors which match the proof sheet will not be produced.

Furthermore, the printing press whose ink keys have been set to target densities may not necessarily produce a print according to the target densities because the printing press has a complex printing mechanism. As a consequence, the densities of a print that is actually produced and the densities of a proof sheet produced for the print may not be in agreement with each other.

SUMMARY OF THE INVENTION

It is an object of the present invention to provide a method of and a system for easily and quickly predicting the colors of a print in a manner which highly accurately matches the sensation of the operator when the operator changes the densities of the print to be generated by a printing press.

According to the present invention, there is provided a method of predicting the colors of a print produced by a printing press, comprising the steps of:

generating a standard density color chart with the printing press which is set to standard density conditions for producing the print of standard densities, and measuring the standard density color chart to determine standard measured values;

generating a changed density color chart with the printing press which is set to changed density conditions in which the densities of color materials used to generate the print are individually changed by respective given amounts and the densities of other color materials than the color material with the changed density are fixed to the standard density conditions, and measuring the changed density color chart to determine changed measured values;

determining monochromatic standard densities of the standard density color chart which is generated from the color materials;

determining monochromatic changed densities of the changed density color chart which is generated from the color materials; and determining corrective standard measured values with respect to standard density setting values for the respective color materials which are set as the standard density conditions, and the differences between the corrective standard measured values and corrective changed measured values with respect to changed density setting values for the respective color materials which are set as the changed density conditions, according to a first relational expression of the corrective standard measured values and the differences which represent the standard measured values with respect to the monochromatic standard densities and a second relational expression of the corrective standard measured values and the differences which represent the changed measured values with respect to the monochromatic changed densities;

whereby the colors of the print under desired changed density conditions are predicted using the corrective standard measured values and the differences.

According to the present invention, there is also provided a print color predicting system for predicting the colors of a print produced by a printing press, comprising:

a calculator for, based on standard measured values obtained by measuring a standard density color chart generated with the printing press which is set to standard density conditions for producing the print of standard densities, and changed measured values obtained by measuring a changed density color chart generated with the printing press which is set to changed density conditions in which the densities of color materials used to generate the print are individually changed by respective given amounts and the densities of other color materials than the color material with the changed density are fixed to the standard density conditions, determining corrective standard measured values with respect to standard density setting values for the respective color materials which are set as the standard density conditions, and the differences between the corrective standard measured values and corrective changed measured values with respect to changed density setting values for the respective color materials which are set as the changed density conditions, according to a first relational expression of the corrective standard measured values and the differences which represent the standard measured values with respect to monochromatic standard densities of the standard density color chart and a second relational expression of the corrective standard measured values and the differences which represent the changed measured values with respect to monochromatic changed densities of the changed density color chart;

a storage unit for storing the corrective standard measured values and the differences;

a setting unit for setting target densities for the respective color materials; and a generator for adjusting the corrective standard measured values with the differences for the color materials which are set to the target densities different from the standard densities, and generating a print predicting profile based on the relationship between data for generating the standard density color chart and the adjusted corrective standard measured values;

whereby the colors of the print which is set to the target densities are predicted using the print predicting profile.

When the operator changes the densities of a print produced by the printing press, the print color predicting method and the print color predicting system according to the present invention easily and quickly produce a proof for the print which highly accurately matches the sensation of the operator, and predicts the colors of the print using the proof.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14 is a diagram showing the relationship between density variations and colorimetric value differences.

DESCRIPTION OF THE PREFERRED EMBODIMENTS

Figure 1:
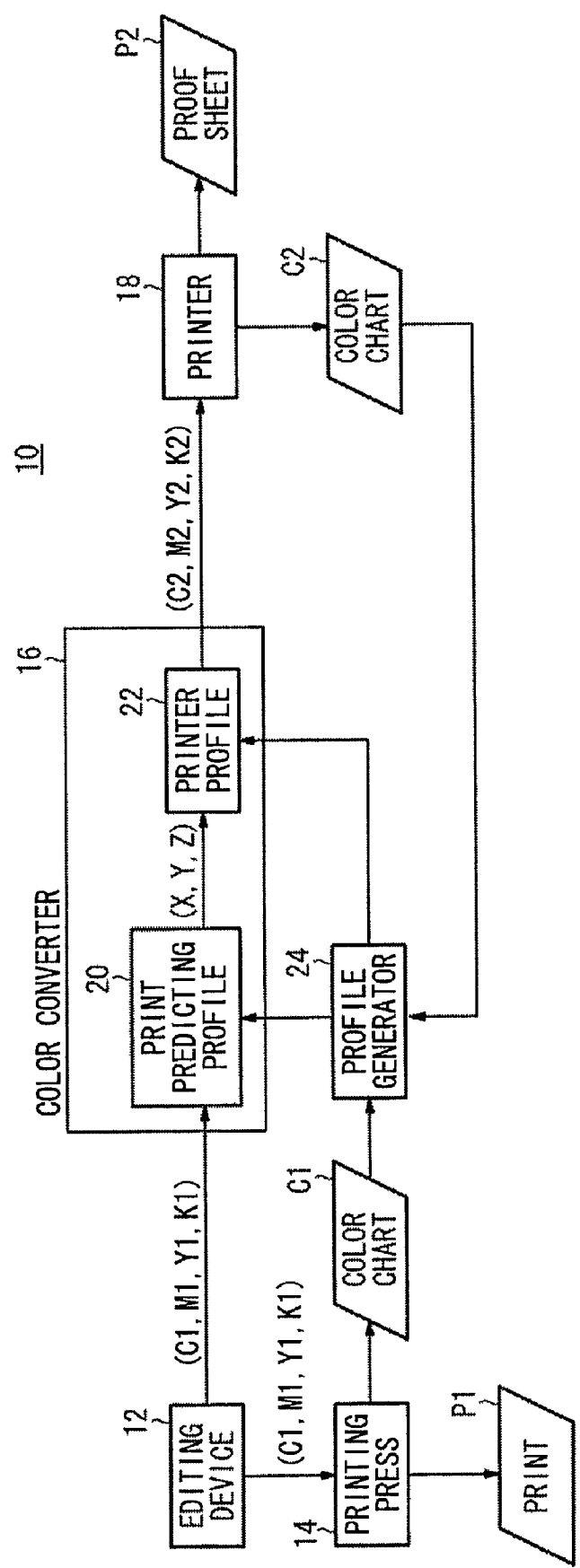
FIG. 1 is a block diagram of an overall arrangement of a print color predicting system according to an embodiment of the present invention.

Like or corresponding parts are denoted by like or corresponding reference characters throughout views.

FIG. 1 shows in block form a print color predicting system 10 according to an embodiment of the present invention. As shown in FIG. 1, the print color predicting system 10 comprises an editing device 12 for editing image data C1, M1, Y1, K1 for controlling the colors C, M, Y, K, a printing press 14 for producing a print P1 based on the edited image data C1, M1, Y1, K1, a color converter 16 for converting the image data C1, M1, Y1, K1 into image data C2, M2, Y2, K2 for predicting colors, a printer (output device) 18 for generating a proof sheet (proof) P2 for the print P1 based on the image data C2, M2, Y2, K2, and a profile generator 24 for generating a print predicting profile 20 and a printer profile (output profile) 22 which are incorporated in the color converter 16.

The print predicting profile 20 is a profile for predicting device-independent calorimetric values of the print P1 produced by the printing press 14, e.g., calorimetric values X, Y, Z or colorimetric values L*, a*, b* of the print P1. The print predicting profile 20 is generated by the profile generator 24 based on known image data C, Y, M, K and measured values of a color chart C1 that is produced from the image data C, M, Y, K by the printing press 14.

Figure 2:
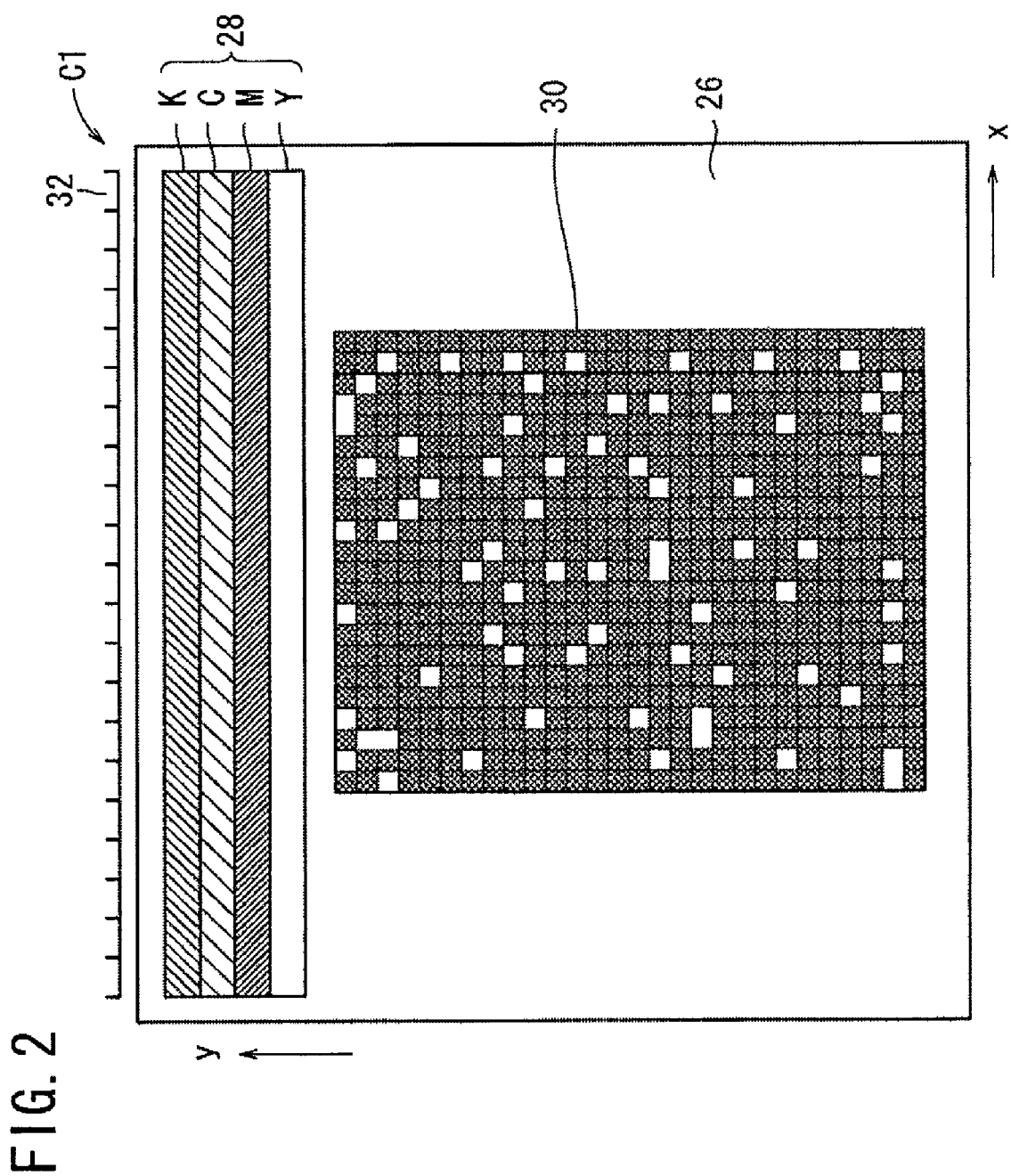
FIG. 2 is a diagram showing a color chart.

As shown in FIG. 2, the color chart C1 that is produced by the printing press 14 comprises a plurality of monochromatic solid density patches 28 produced on a given print sheet 26 at density setting values set by the operator with inks (color materials) C, M, Y, K according to a halftone dot percentage of 100%, and a number of color patches 30 of primary through quaternary colors produced with the inks C, M, Y, K according to halftone dot percentages set at predetermined intervals in the range from 0 to 100%. The color chart C1 is produced by adjusting the film thicknesses of the inks C, M, Y, K with a number of ink keys 32 arrayed in the direction indicated by the arrow x and moving the print sheet 26 in the direction indicated by the arrow y. Each of the ink keys 32 serves to adjust the density of one of the inks on the color chart C1. The monochromatic solid density patches 28 extend in the direction in which the ink keys 32 are arrayed, i.e., in the direction indicated by the arrow x, for correcting density irregularities in the direction indicated by the arrow x on the print sheet 26.

The printer profile 22 is a profile for converting device-independent colorimetric values of the print P1 predicted by the print predicting profile 20, e.g., calorimetric values X, Y, Z or calorimetric values L*, a*, b* of the print P1, into image data C2, M2, Y2, K2 depending on the output characteristics of the printer 18. The printer profile 22 is generated by the profile generator 24 based on known image data C, M, Y, K and measured values of a color chart C2 that is produced from the image data C, M, Y, K by the printer 18.

Figure 3:
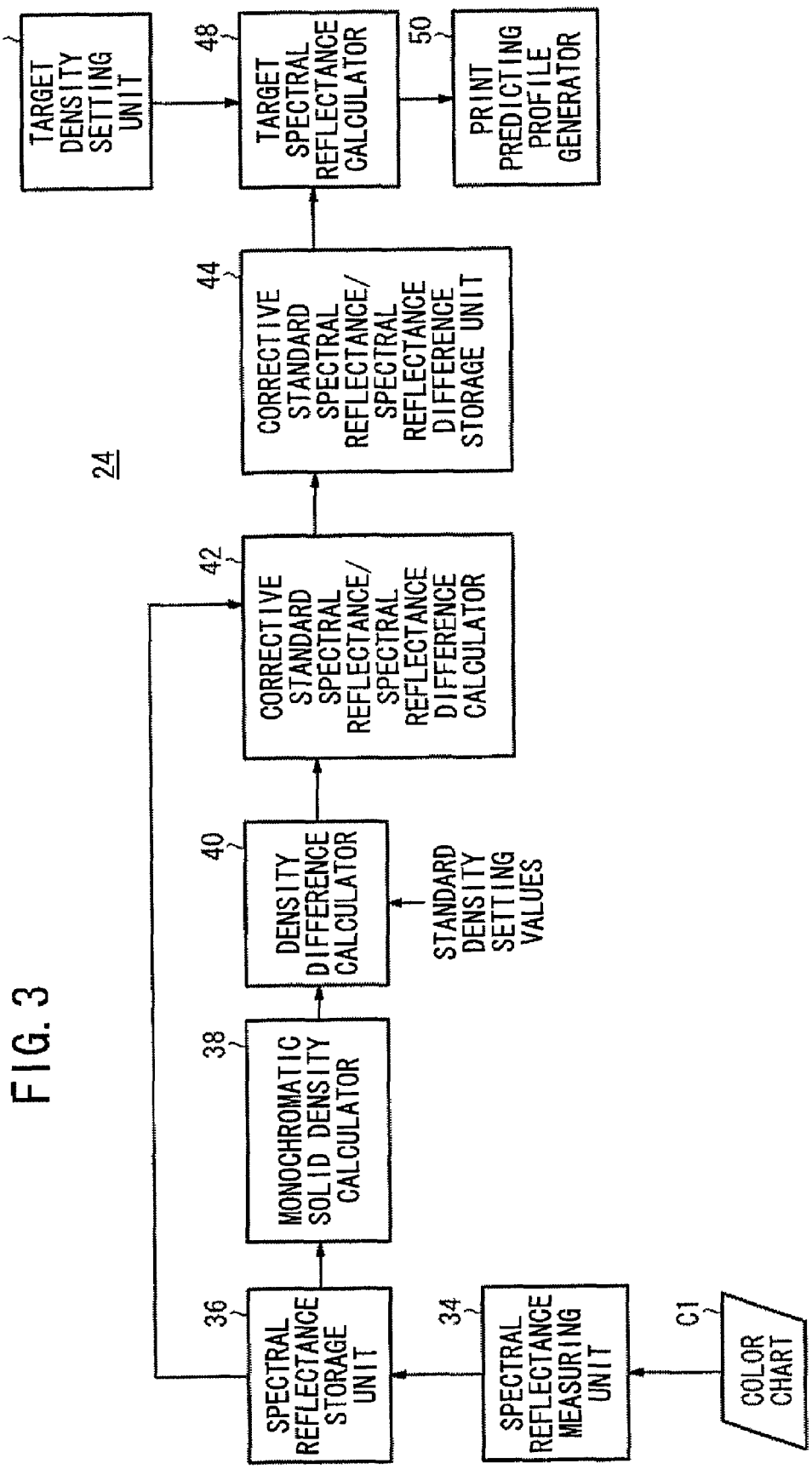
FIG. 3 is a block diagram of a function to generate a print predicting profile, of a profile generator of the print color predicting system shown in FIG. 1.

FIG. 3 shows in block form a function to generate the print predicting profile 20, of the profile generator 24. As shown in FIG. 3, the profile generator 24 includes a spectral reflectance measuring unit 34 for measuring the spectral reflectances of a color chart C1 which are generated at density setting values set by the operator, a spectral reflectance storage unit 36 for storing the spectral reflectances that are measured by the spectral reflectance measuring unit 34, a monochromatic solid density calculator 38 for calculating monochromatic solid densities from the spectral reflectances of the monochromatic solid density patches 28, a density difference calculator 40 for calculating the density differences between standard density setting values which are standard density conditions for obtaining a print P1 of standard densities and the monochromatic solid densities, a corrective standard spectral reflectance/spectral reflectance difference calculator 42 for calculating corrective standard spectral reflectances and spectral reflectance differences using the density difference and the spectral reflectances of the monochromatic solid density patches 28 and the color patch 30, a corrective standard spectral reflectance/spectral reflectance difference storage unit 44 for storing the corrective standard spectral reflectances and the spectral reflectance differences that are calculated by the corrective standard spectral reflectance/ spectral reflectance difference calculator 42, a target density setting unit 46 for setting desired target densities for the respective colors C, M, Y, K, a target spectral reflectance calculator 48 for calculating target spectral reflectances for achieving target densities, using the corrective standard spectral reflectances, the spectral reflectance differences, and the target densities, and a print predicting profile generator 50 for generating a print predicting profile 20 using the target spectral reflectances.

The corrective standard spectral reflectances refer to spectral reflectances obtained when a color chart C1 that is supposed to be generated by setting standard density setting values as standard density conditions is generated at densities according to the standard density setting values. The spectral reflectance differences refer to the differences between the corrective standard spectral reflectances and spectral reflectances obtained when a color chart C1 that is supposed to be generated by setting changed density setting values as changed density conditions is generated at densities according to the changed density setting values.

The standard density conditions refer to conditions for adjusting printing conditions such as ink film thicknesses, etc. of the printing press 14 such that when the printing press 14 produces the color chart C1 with halftone dot percentages set to be 100% for the inks C, M, Y, K, the densities of the inks of the color chart C1 will become the standard densities defined by a user which may be a printing company or the like. The changed density conditions refer to conditions for individually changing the densities of the inks C, M, Y, K from the standard densities by respective given amounts, and fixing the densities of other inks than the ink to be changed, to standard densities.

Figure 4:
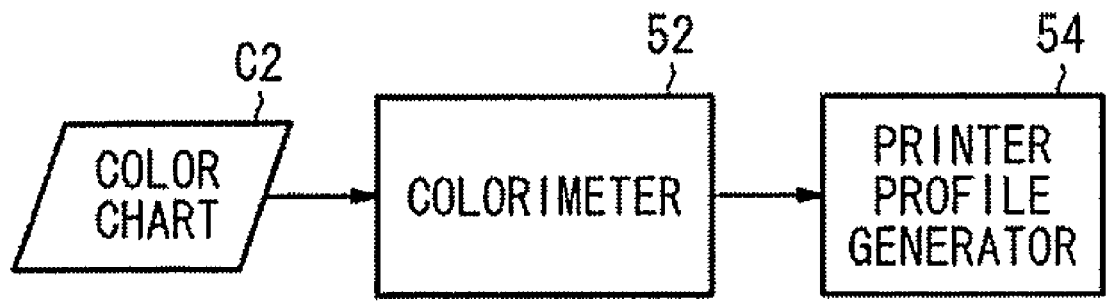
FIG. 4 is a block diagram of a function to generate a printer profile, of the profile generator of the print color predicting system shown in FIG. 1.

FIG. 4 shows in block form a function to generate the printer profile 22, of the profile generator 24. As shown in FIG. 4, the profile generator 24 includes a colorimeter 52 for measuring calorimetric values, e.g., colorimetric values X, Y, Z or colorimetric values L*, a*, b*, of the color chart C2 generated by the printer 18, and a printer profile generator 54 for generating a printer profile 22 using the measured calorimetric values.

Figure 5:
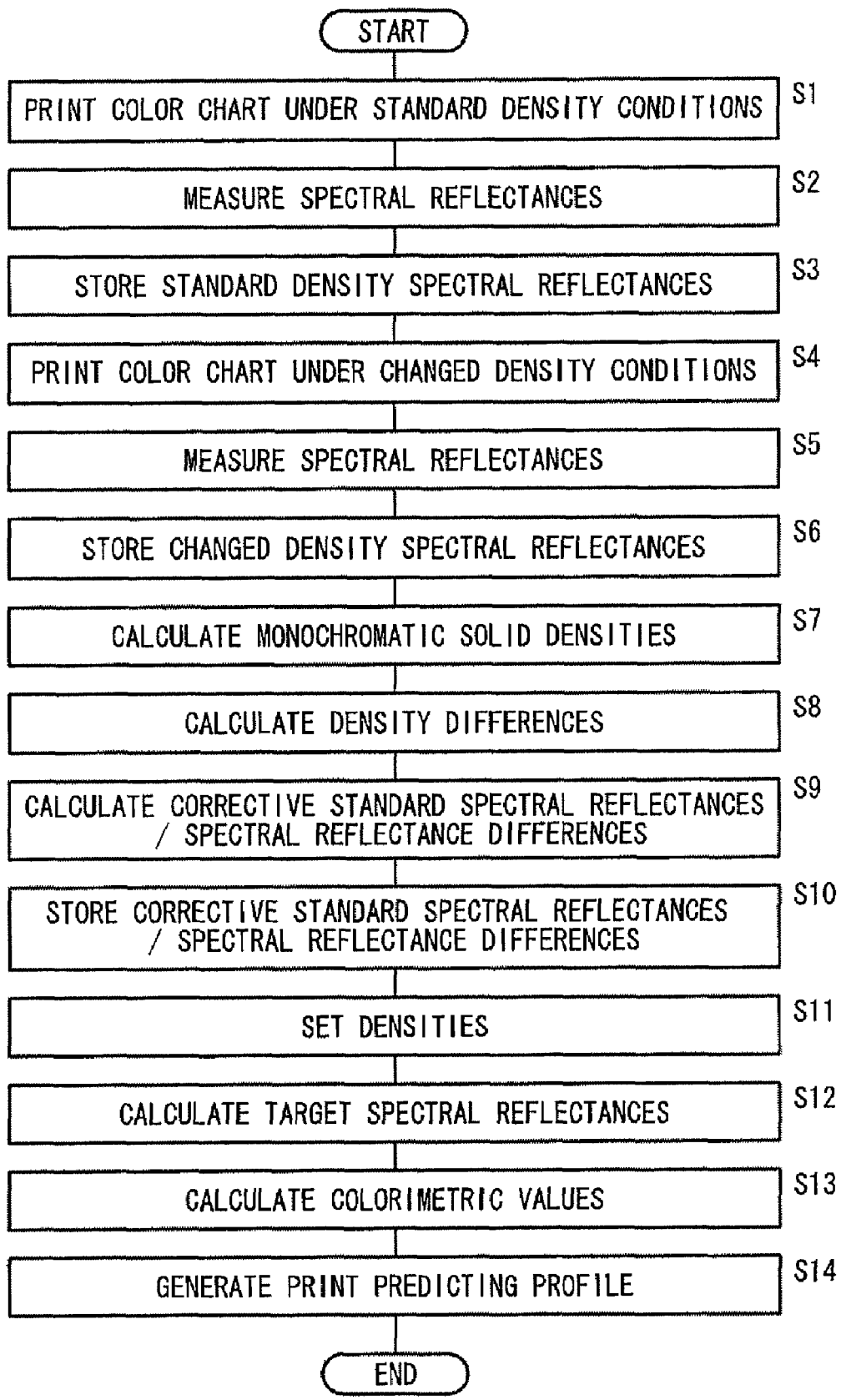
FIG. 5 is a flowchart of a sequence of generating a print predicting profile.

The print color predicting system 10 according to the present embodiment is basically constructed as described above. A print color predicting method carried out by the print color predicting system 10 will be described below with reference to a flowchart shown in FIG. 5.

The editing device 12 supplies known image data C1, M1, Y1, K1 to the printing press 14, which is set to the standard density conditions and prints a color chart C1 (standard density color chart) (step S1). The color chart C1 comprises a plurality of monochromatic solid density patches 28 and color patches 30 printed in respective halftone dot % of the image data C1, M1, Y1, K1 at predetermined intervals in the range from 0% to 100% (see FIG. 2).

The monochromatic solid density patches 28 and the color patches 30 on the color chart C1 generated by the printing press 14 set to the standard density conditions are measured for spectral reflectances by the spectral reflectance measuring unit 34 (step S2). The measured spectral reflectances are stored as standard density spectral reflectances (standard measured values) in the spectral reflectance storage unit 36 (step S3).

Then, the standard density conditions of the printing press 14 are changed to given changed density conditions, and the printing press 14 prints color charts C1 (changed density color chart) under the changed density conditions using the same image data C1, M1, Y1, K1 as those for printing the color chart C1 under the standard density conditions (step S4). The changed density conditions of the printing press 14 are established by individually changing the densities of the monochromatic solid density patches 28 produced with the inks C, M, Y, K at a halftone dot percentage of 100%, and fixing the densities of those inks other than the changed ink to the standard densities, so that the densities under the changed density conditions are changed by −0.2, −0.1, +0.1, and +0.2, for example, with reference to the standard densities under the standard density conditions in terms of optical densities. Accordingly, there are 16 color charts C1 generated under the changed density conditions with the density of each of the colors C, M, Y, K at the 100 halftone dot % being set to the standard density −0.2, the standard density −0.1, the standard density +0.1, and the standard density +0.2, respectively.

The monochromatic solid density patches 28 and the color patches 30 on the color charts C1 generated by the printing press 14 under the changed density conditions are measured for spectral reflectances by the spectral reflectance measuring unit 34 (step S5). The measured spectral reflectances are stored as changed-density spectral reflectances (changed measured values) in the spectral reflectance storage unit 36 (step S6).

It is assumed, for example, that the spectral reflectance under the standard density conditions of a monochromatic solid density patch 28 of only C 100% is represented by $R_{C(std)}$, the spectral reflectance under the standard density conditions of a monochromatic solid density patch 28 of only M 100% by $R_{M(std)}$, the changed density spectral reflectance under given changed density conditions of the monochromatic solid density patch 28 of only C 100% by $(R_{C(std)}+\Delta R_C)$, and the changed density spectral reflectance under the given changed density conditions of the monochromatic solid density patch 28 of only M 100% by $(R_{M(std)}+\Delta R_M)$. Then, the spectral reflectance $R_{CM}$ under the given changed density conditions of color patches 30 of halftone dot percentages of C 100% and M 100% is expressed as follows:

$$\begin{aligned} R_{CM} &= (R_{C(std)} + \Delta R_C) \cdot (R_{M(std)} + \Delta R_M) \\ &= R_{C(std)} \cdot R_{M(std)} + \\ &\quad \{R_{M(std)} \cdot (R_{C(std)} + \Delta R_C) - R_{C(std)} \cdot R_{M(std)}\} + \\ &\quad \{R_{C(std)} \cdot (R_{M(std)} + \Delta R_M) - R_{C(std)} \cdot R_{M(std)}\} + \\ &\quad \Delta R_C \cdot \Delta R_M \end{aligned} \qquad (1)$$

If the fourth term on the right side of the equation (1) is small enough to be regarded as 0, then the first term on the right side represents a standard spectral reflectance produced when the color patches 30 of halftone dot percentages of C 100% and M 100% are generated under the standard density conditions, the second term on the right side represents the difference of a changed density spectral reflectance produced by changing, under given changed density conditions, the density of only C 100% of the color patches 30 of halftone dot percentages of C 100% and M 100%, from the standard density conditions, and the third term on the right side represents the difference of a changed density spectral reflectance produced by changing, under given changed density conditions, the density of only M 100% of the color patches 30 of halftone dot percentages of C 100% and M 100%, from the standard density conditions.

Therefore, the spectral reflectance $R_{CM}$ caused when the densities of both the colors C, M are changed can be determined by adding each difference produced when one of the densities of the colors C, M is fixed and the other changed, to the standard spectral reflectance $R_{C(std)} \cdot R_{M(std)}$ under the standard density conditions.

Figure 6:
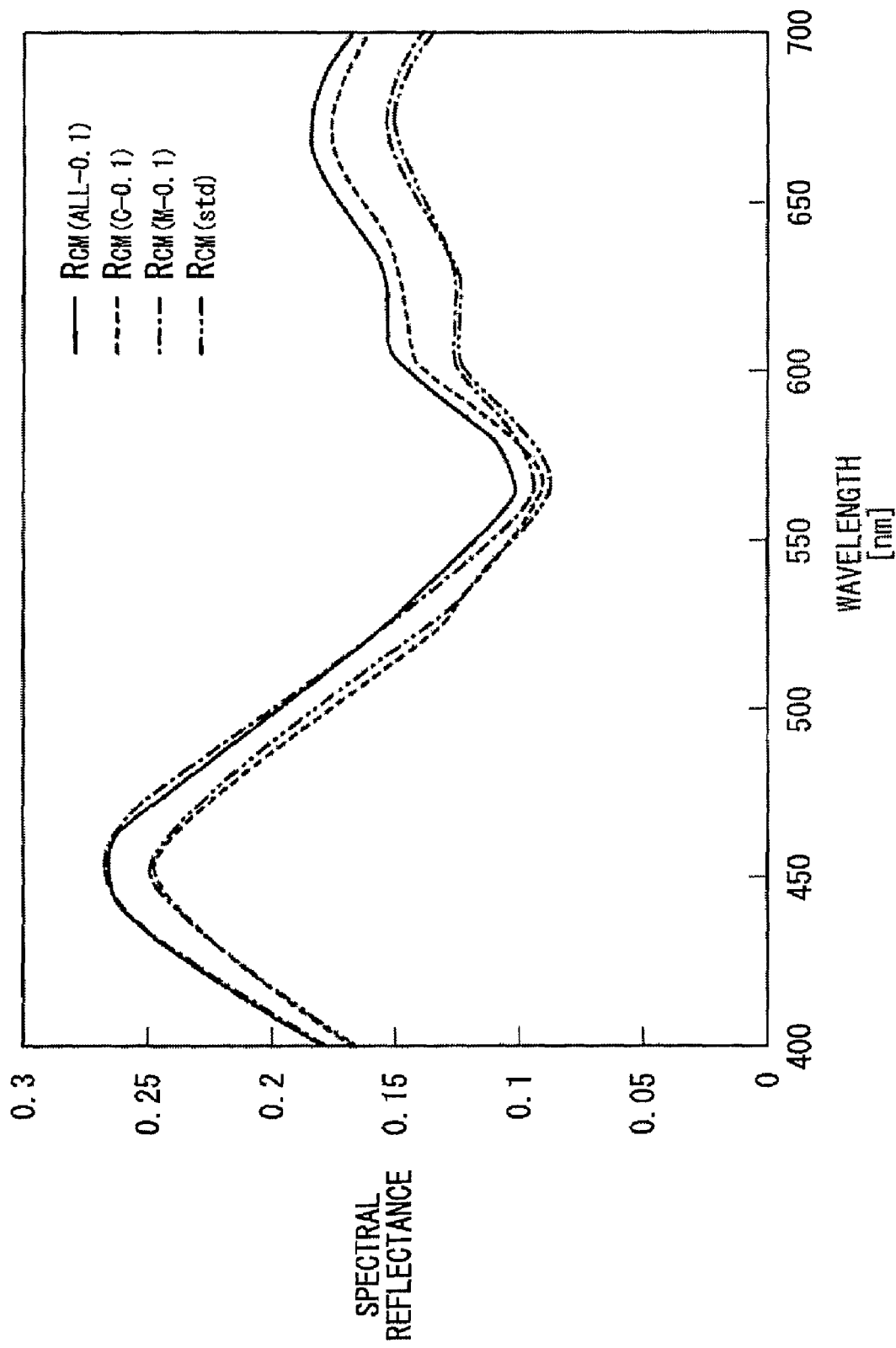
FIG. 6 is a diagram illustrative of spectral reflectances under standard density conditions and changed density conditions.

FIG. 6 shows measured data of the spectral reflectance $R_{CM(std)}$ of color patches 30 of halftone dot percentages of C 100% and M 100% generated under the standard density conditions, the spectral reflectance $R_{CM(M-0.1)}$ of color patches 30 generated under changed density conditions in which C 100% is fixed to the standard density and only M 100% is changed to (standard density −0.1), the spectral reflectance $R_{CM(C-0.1)}$ of color patches 30 generated under changed density conditions in which M 100% is fixed to the standard density and only C 100% is changed to (standard density −0.1), and the spectral reflectance $R_{CM(ALL-0.1)}$ of color patches 30 generated under changed density conditions in which both C 100% and M 100% are changed to (standard density −0.1).

Figure 7:
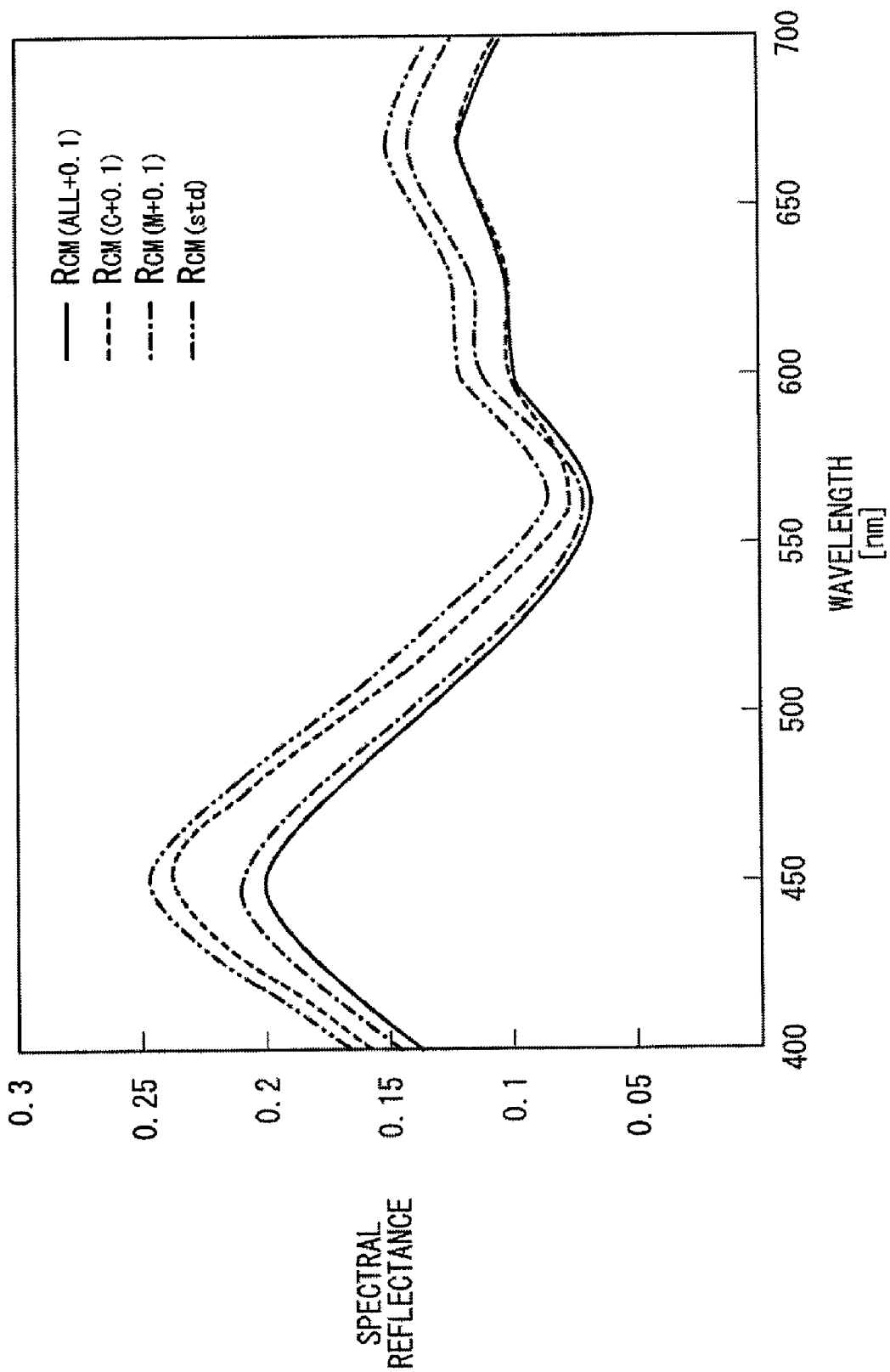
FIG. 7 is a diagram illustrative of spectral reflectances under standard density conditions and changed density conditions.

FIG. 7 shows measured data of the spectral reflectance $R_{CM(std)}$ of color patches 30 of halftone dot percentages of C 100% and M 100% generated under the standard density conditions, the spectral reflectance $R_{CM(M+0.1)}$ of color patches 30 generated under changed density conditions in which C 100% is fixed to the standard density and only M 100% is changed to (standard density +0.1), the spectral reflectance $R_{CM(C+0.1)}$ of color patches 30 generated under changed density conditions in which M 100% is fixed to the standard density and only C 100% is changed to (standard density +0.1), and the spectral reflectance $R_{CM(ALL+0.1)}$ of color patches 30 generated under changed density conditions in which both C 100% and M 100% are changed to (standard density +0.1).

In this case, the spectral reflectance $R_{CM(ALL-0.1)}$ is approximately determined according to the equation:

$$R_{CM(ALL-0.1)} = R_{CM(std)} + (R_{CM(C-0.1)} - R_{CM(std)}) + (R_{CM(M-0.1)} - R_{CM(std)})$$

and the spectral reflectance $R_{CM(ALL+0.1)}$ is approximately determined according to the equation:

$$R_{CM(ALL+0.1)} = R_{CM(std)} + (R_{CM(C+0.1)} - R_{CM(std)}) + (R_{CM(M+0.1)} - R_{CM(std)})$$

From the above results, a target spectral reflectance R, which is a target changed density spectral reflectance at the time C, M, M, K are changed to an arbitrary target density under desired changed density conditions, is determined according to the following equation:

$$R = R_{std} + R_{\Delta C} + R_{\Delta M} + R_{\Delta Y} + R_{\Delta K} \quad (2)$$

based on the above equation (1), where $R_{std}$ represents a standard spectral reflectance, $R_{\Delta C}$ a spectral reflectance difference at the time the density of only C is changed, $R_{\Delta M}$ a spectral reflectance difference at the time the density of only M is changed, $R_{\Delta Y}$ a spectral reflectance difference at the time the density of only Y is changed, and $R_{\Delta K}$ a spectral reflectance difference at the time the density of only K is changed.

The approximate equation (2) is based on the premises that the monochromatic solid density patches 28 and the color patches 30 of the color chart C1 generated under the standard density conditions and the changed density conditions are of densities according to standard density setting values and changed density setting values that have been set by the operator. Actually, it is impossible to obtain the color chart C1 having the densities according to standard density setting values and changed density setting values.

The monochromatic solid density calculator 38 calculates monochromatic solid densities under the standard density conditions and the changed density conditions from the spectral reflectances of the monochromatic solid density patches 28 of the color chart C1 (step S7). Instead, monochromatic solid densities may be directly measured using a densitometer, rather than being calculated from the spectral reflectances measured by the spectral reflectance measuring unit 34. Then, the density difference calculator 40 calculates the density differences between the calculated monochromatic solid densities and the standard density setting values (step S8).

It is assumed that the standard density setting values of the respective colors C, M, Y, K are represented by C, M, Y, K, the density differences of the monochromatic solid density patches 28 from the standard density setting values by $\Delta C$, $\Delta M$, $\Delta Y$, $\Delta K$, a corrective standard spectral reflectance which refers to a spectral reflectance for obtaining densities according to the standard density setting values C, M, Y, K is represented by $R_{std}(C, M, Y, K)$, the difference between the spectral reflectance at the time only the standard density setting value C is changed by $\Delta C$ and a density according to the changed density setting value C+$\Delta C$ is obtained and the corrective standard spectral reflectance, is represented by $R_{\Delta C}(C+\Delta C)$, the difference between the spectral reflectance at the time only the standard density setting value M is changed by $\Delta M$ and a density according to the changed density setting value M+$\Delta M$ is obtained and the corrective standard spectral reflectance, is represented by $R_{\Delta M}(M+\Delta M)$, the difference between the spectral reflectance at the time only the standard density setting value Y is changed by $\Delta Y$ and a density according to the changed density setting value Y+$\Delta Y$ is obtained and the corrective standard spectral reflectance, is represented by $R_{\Delta Y}(Y+\Delta Y)$, and the difference between the spectral reflectance at the time only standard density setting value K is changed by $\Delta K$ and a density according to the changed density setting value K+$\Delta K$ is obtained and the corrective standard spectral reflectance, is represented by $R_{\Delta K}(K+\Delta K)$. Then, from the equation (2), the spectral reflectance $R(C+\Delta C, M+\Delta M, Y+\Delta Y, K+\Delta K)$ obtained by measuring the color chart C1 is expressed by:

$$R(C + \Delta C, M + \Delta M, Y + \Delta, K + \Delta K) = R_{std}(C, M, Y, K) + \quad (3)$$
$$R_{\Delta C}(C + \Delta C) + R_{\Delta M}(M + \Delta M) + R_{\Delta Y}(Y + \Delta Y) + R_{\Delta K}(K + \Delta K)$$

If the standard densities for C, M, Y, K are changed by +0.1 under the changed density conditions, for example, in the equation (3), then the equation (3) is approximated by the following equation (4):

$$R(C + \Delta C, M + \Delta M, Y + \Delta, K + \Delta K) = \quad (4)$$
$$R_{std}(C, M, Y, K) + 10 \cdot \Delta C \cdot R_{\Delta C}(C + 0.1) + 10 \cdot \Delta M \cdot R_{\Delta M}(M + 0.1) +$$
$$10 \cdot \Delta Y \cdot R_{\Delta Y}(Y + 0.1) + 10 \cdot \Delta K \cdot R_{\Delta K}(K + 0.1)$$

In the equation (4), the spectral reflectance $R(C+\Delta C, M+\Delta M, Y+\Delta Y, K+\Delta K)$ is of a value obtained by measuring the color chart C1 and is known. The density differences $\Delta C$, $\Delta M$, $\Delta Y$, $\Delta K$ have been calculated by the density difference calculator 40. The corrective standard spectral reflectance $R_{std}(C, M, Y,$ K) and the spectral reflectance differences $R_{\Delta C}(C+0.1)$, $R_{\Delta M}(M+0.1)$, $R_{\Delta Y}(Y+0.1)$, and $R_{\Delta K}(K+0.1)$ for obtaining accurate standard densities and changed densities are unknown quantities. Five simultaneous equations (4) may be solved in order to determine those unknown quantities.

In this case, the unknown quantities can be determined using the relationship between a plurality of spectral reflectances obtained by setting a plurality of changed density conditions and the density differences of the color chart C1 (step S9). For example, for determining a target spectral reflectance R with respect to the secondary colors C, M, if it is assumed that the standard density setting values are represented by C, M and the monochromatic solid densities of the color chart C1 obtained under the standard density conditions is represented by C+0.01, M−0.01, then from the equation (4), the following equation is satisfied:

$$R(C+0.01, M-0.01) = \quad (5)$$
$$R_{std}(C, M, Y, K) + 0.1 \cdot R_{\Delta C}(C+0.1) + 0.1 \cdot R_{\Delta M}(M-0.1)$$

In order to determine the unknown spectral reflectance differences $R_{\Delta C}(C+0.1)$, $R_{\Delta M}(M−0.1)$, the following equations are satisfied by changing C by 0.1, −0.1 and changing M by 0.1, −0.1:

$$R(C+0.11, M+0.009) = \quad (6)$$
$$R_{std}(C, M, Y, K) + 1.1 \cdot R_{\Delta C}(C+0.1) + 0.09 \cdot R_{\Delta M}(M+0.1)$$

$$R(C-0.09, M-0.0) = R_{std}(C, M, Y, K) + 0.9 \cdot R_{\Delta C}(C-0.1) \quad (7)$$

$$R(C+0.01, M+0.1) = \quad (8)$$
$$R_{std}(C, M, Y, K) + 0.1 \cdot R_{\Delta C}(C-0.1) + R_{\Delta M}(M+0.1)$$

$$R(C+0.01, M-0.11) = \quad (9)$$
$$R_{std}(C, M, Y, K) + 0.1 \cdot R_{\Delta C}(C+0.1) + 1.1 \cdot R_{\Delta M}(M-0.1)$$

An arbitrary target spectral reflectance R can be determined by solving the simultaneous equations (5) through (9). The monochromatic solid densities at the time when C is changed by 0.1, are C+0.11, M−0.01, the monochromatic solid densities at the time when C is changed by −0.1, are C−0.09, M−0.0, the monochromatic solid densities at the time when M is changed by 0.1, are C−0.01, M+0.1, and the monochromatic solid densities at the time when M is changed by −0.1, are C+0.01, M−0.11. The simultaneous equations (5) through (9) are solved for each wavelength.

The corrective standard spectral reflectances $R_{std}$(C, M, Y, K) and the spectral reflectance differences $R_{\Delta C}(C+0.1)$, $R_{\Delta M}(M+0.1)$, $R_{\Delta Y}(Y+0.1)$, and $R_{\Delta K}(K+0.1)$ thus calculated are then stored in the corrective standard spectral reflectance/spectral reflectance difference storage unit 44 (step S10). The spectral reflectance differences may be determined by changing the densities of the inks C, M, Y, K by arbitrary densities such as a changing density ±0.1, ±0.2, or the like.

As shown in FIG. 2, the color chart C1 used to calculate corrective standard spectral reflectances and spectral reflectance differences may include density irregularities in the direction indicated by the arrow x, which is perpendicular to the printing direction, i.e., the direction indicated by the arrow y, due to mechanical setting errors of the ink keys 32. Therefore, the spectral reflectances of the monochromatic solid density patches 28 may be measured at each printing position in the direction indicated by the arrow x on the color chart C1, and corrective standard spectral reflectances and spectral reflectance differences may be calculated depending on the printing position. Corrective standard spectral reflectances and spectral reflectance differences at any arbitrary printing positions may be determined by interpolation at such arbitrary printing positions.

After the above preparatory process is finished, a print predicting profile 20 is generated at the time the standard density conditions are set to arbitrary changed density conditions.

The target density setting unit 46 sets desired target densities for the colors C, M, Y, K (step S11). Then, the target spectral reflectance calculator 48 calculates the target spectral reflectance R according to the equation (2), using the corrective standard spectral reflectances $R_{std}$ and spectral reflectance differences $R_{\Delta C}$, $R_{\Delta M}$, $R_{\Delta Y}$, $R_{\Delta K}$ stored in the corrective standard spectral reflectance/spectral reflectance difference storage unit 44 (step S12). The values of the corrective standard spectral reflectances $R_{std}$ and standard spectral differences $R_{\Delta C}$, $R_{\Delta M}$, $R_{\Delta Y}$, $R_{\Delta K}$ have already been calculated according to the equation (3).

For changing only the standard density setting value of C to the target density, only the spectral reflectance difference $R_{\Delta C}$ for C is added to the corrective standard spectral reflectance $R_{std}$, and the target spectral reflectance R is calculated with the other spectral reflectance differences $R_{\Delta M}$, $R_{\Delta Y}$, $R_{\Delta K}$ being set to 0. For changing the standard density setting values of C, M to the respective target densities, the spectral reflectance differences $R_{\Delta C}$, $R_{\Delta M}$ for C, M are added to the corrective standard spectral reflectance $R_{std}$, and the target spectral reflectance R is calculated with the other spectral reflectance differences $R_{\Delta Y}$, $R_{\Delta K}$ being set to 0.

If the standard density setting values of all the four colors C, M, Y, K are changed to respective target densities, then the target spectral reflectance R can be calculated according to the equation (2). However, if the color patches to be processed for calculating the target spectral reflectance R are in three colors C, M, Y, then the spectral reflectance difference $R_{\Delta K}$ should ideally be 0 regardless of changes in the density of K. Actually, the spectral reflectance difference $R_{\Delta K}$ may not be 0 due to printing and measuring variations.

Even if the standard density setting values of all the four colors C, M, Y, K are changed to respective target densities, it is desirable to calculate the target spectral reflectance R with the spectral reflectance difference $R_{\Delta K}$ being set to 0 in the event that the color patches to be processed for calculating the target spectral reflectance R are in three colors C, M, Y. Similarly, in the event that the color patches to be processed for calculating the target spectral reflectance R are in two colors C, M, it is desirable to calculate the target spectral reflectance R with the spectral reflectance differences $R_{\Delta Y}$, $R_{\Delta K}$ being set to 0.

When the spectral reflectance differences $R_{\Delta C}$, $R_{\Delta M}$, $R_{\Delta Y}$, $R_{\Delta K}$ are generated based on the changed density conditions adjusted such that, for example, density changes are −0.2, −0.1, +0.1, and +0.2 with reference to the standard densities under the standard density conditions in terms of optical densities, and in the case where the set density change is +0.15, the spectral reflectance differences $R_{\Delta C}$, $R_{\Delta M}$, $R_{\Delta Y}$, $R_{\Delta K}$ with respect to the density change of +0.15 can be determined by interpolating the spectral reflectance differences $R_{\Delta C}$, $R_{\Delta M}$, $R_{\Delta Y}$, $R_{\Delta K}$ for the density change of +0.1 and the spectral reflectance differences $R_{\Delta C}$, $R_{\Delta M}$, $R_{\Delta Y}$, $R_{\Delta K}$ for the density change of +0.2. The spectral reflectance differences may be interpolated by a known process such as linear interpolation, spline interpolation, polynomial approximation, or the like.

Then, the print predicting profile generator 50 calculates calorimetric values X, Y, Z or calorimetric values L*, a*, b*, for example, from the target spectral reflectance R thus determined (step S13), and generates a print predicting profile 20 which represents the relationship between the calorimetric values X, Y, Z or colorimetric values L*, a*, b* and the image data C1, M1, Y1, K1 used to generate the color chart C1 (step S14). The print predicting profile 20 generated depending on the desired changed densities is set in the color converter 16.

Figure 8:
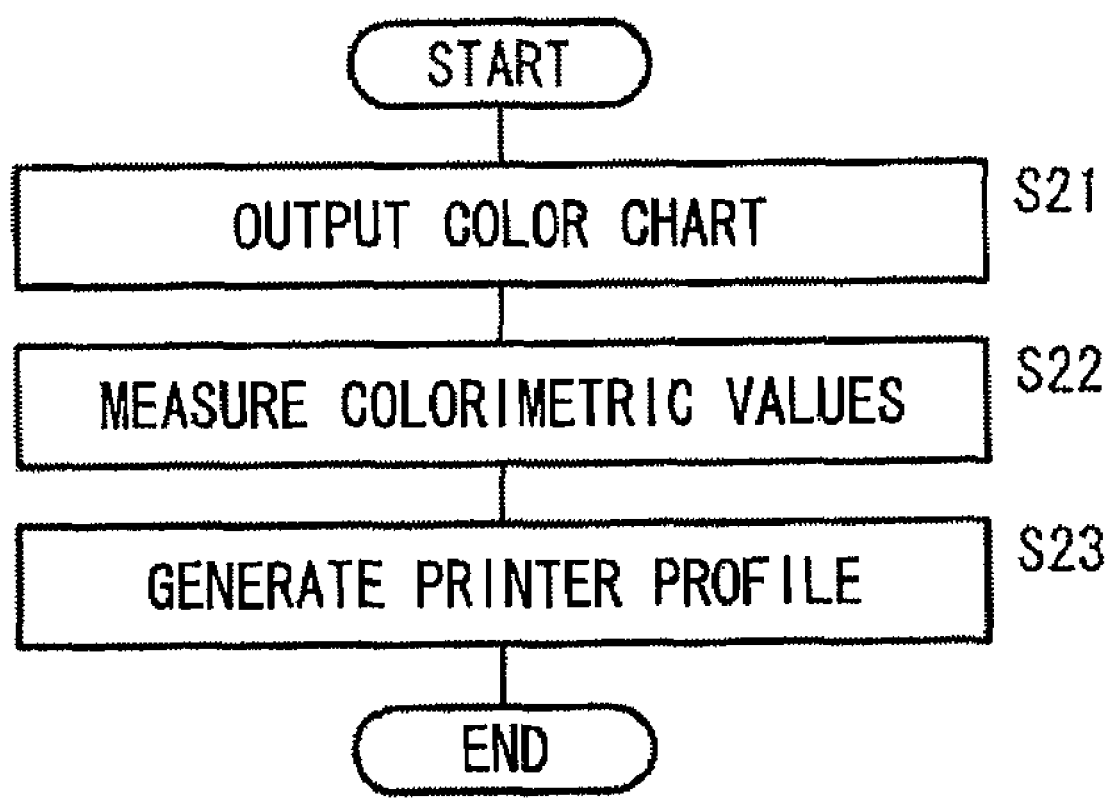
FIG. 8 is a flowchart of a sequence of generating a printer profile.

The color converter 16 supplies image data C2, M2, Y2, K2 to the printer 18, which outputs a color chart C2 made up of a plurality of color patches onto a recording medium (step S21 in FIG. 8) in the same manner as the color chart C1 being printed (step S1).

The color patches on the output color chart C2 are measured for calorimetric values, e.g., calorimetric values X, Y, Z or calorimetric values L*, a*, b*, by the calorimeter 52 (step S22). The printer profile generator 54 generates a printer profile 22 which represents the relationship between the colorimetric values, e.g., colorimetric values X, Y, Z or colorimetric values L*, a*, b* and the image data C2, M2, Y2, K2 used to generate the color chart C2 (step S23). The generated printer profile 22 is set in the color converter 16. Since the printer profile 22 does not depend on the changed density conditions, the printer profile 22 only has to be set once unless the conditions of the printer 18 are changed.

After the print predicting profile 20 and the printer profile 22 have been established as described above, the printer 18 generates a proof sheet P2 for a print P1 to be produced from desired image data C1, M1, Y1, K1.

Figure 9:
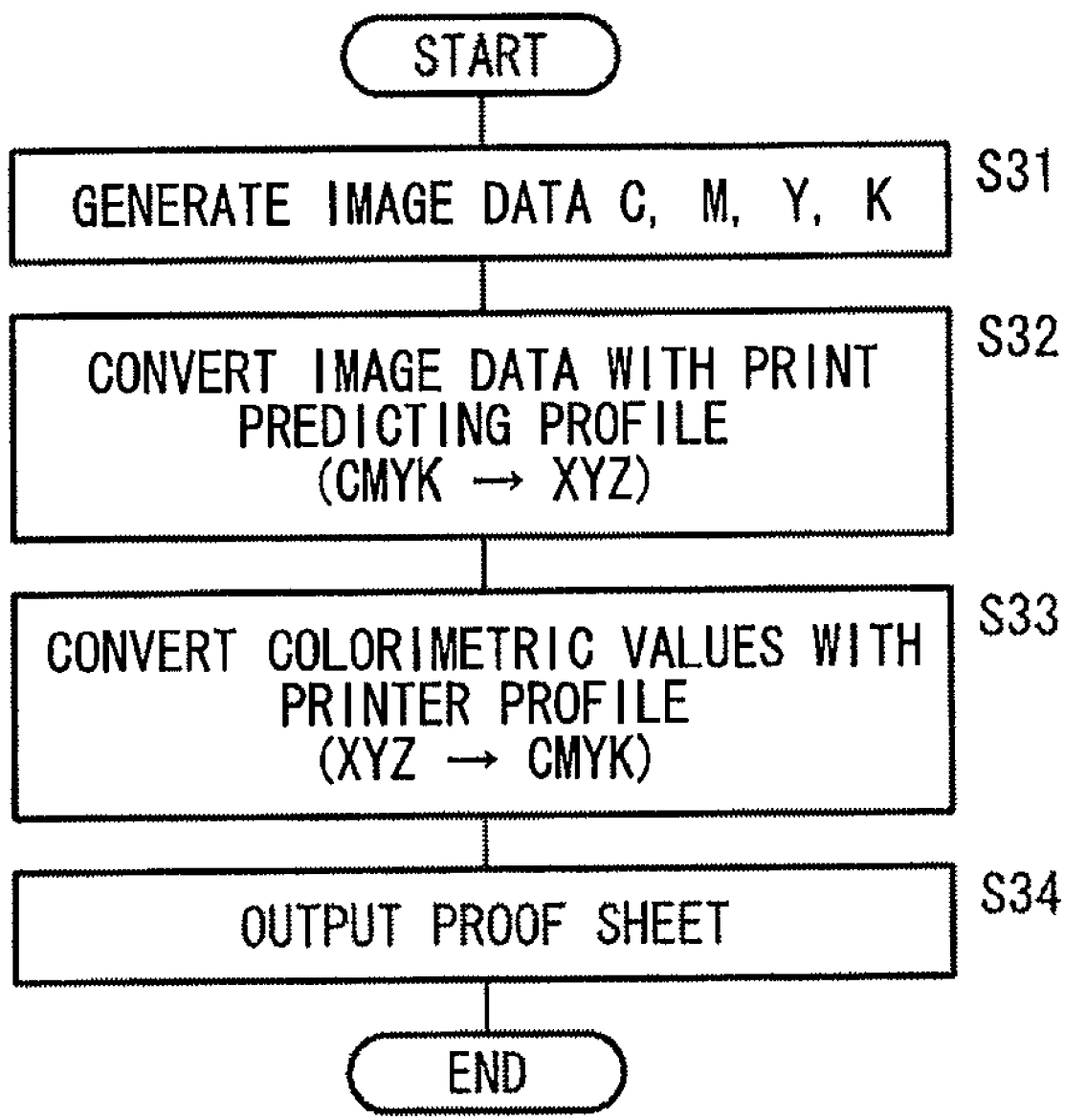
FIG. 9 is a flowchart of a sequence of generating a proof sheet.

Specifically, the editing device 12 generates desired image data C1, M1, Y1, K1 and supplies the generated image data C1, M1, Y1, K1 to the color converter 16 (step S31 in FIG. 9). In the color converter 16, using the print predicting profile 20, the image data C1, M1, Y1, K1 are converted into device-independent calorimetric values, e.g., colorimetric values X, Y, Z or calorimetric values L*, a*, b* (step S32). In this case, the print predicting profile 20 is adjusted such that each of the colors C, M, Y, K has a desired target density at a halftone dot percentage of 100%.

Then, using the printer profile 22, the colorimetric values X, Y, Z or the calorimetric values L*, a*, b* are converted into image data C2, M2, Y2, K2 depending on the output characteristics of the printer 18 (step S33). The printer 18 then produces a proof sheet P2 based on the image data C2, M2, Y2, K2 (step S34).

The print predicting profile 20 and the printer profile 22 may be combined into a single profile, and the image data C2, M2, Y2, K2 may be determined directly from the image data C1, M1, Y1, K1 using the single profile.

Instead of measuring the spectral reflectances of the color chart C1 with the spectral reflectance measuring unit 34, the spectral densities of the color chart C1 may be measured by a spectral densitometer, and the print predicting profile 20 may be generated from the measured spectral densities.

Specifically, it is assumed, for example, that the spectral density under the standard density conditions of a monochromatic solid density patch 28 of only C 100% is represented by $D_{C(std)}$, the spectral density under the standard density conditions of a monochromatic solid density patch 28 of only M 100% by $D_{M(std)}$, the spectral density under given changed density conditions of a monochromatic solid density patch 28 of only C 100% by $(D_{C(std)}+\Delta D_C)$, and the spectral density under the given changed density conditions of a monochromatic solid density patch 28 of only M 100% by $(D_{M(std)}+\Delta D_M)$. Then, the spectral density $D_{CM}$ under the given changed density conditions of color patches 30 of halftone dot percentages of C 100% and M 100% is expressed as follows:

$$D_{CM} = (D_{C(std)} + \Delta D_C) + (D_{M(std)} + \Delta D_M) \quad (10)$$

$$= (D_{C(std)} + D_{M(std)}) +$$

$$[\{(D_{C(std)} + D_{M(std)}) + \Delta D_C\} - (D_{C(std)} + D_{M(std)})] +$$

$$[\{(D_{C(std)} + D_{M(std)}) + \Delta D_M\} - (D_{C(std)} + D_{M(std)})]$$

The first term on the right side of the equation (10) represents a standard spectral density produced when a color patch 30 of halftone dot percentages of C 100% and M 100% is generated under the standard density conditions, the second term on the right side represents the difference of a spectral density produced by changing, under given changed density conditions, the density of only C 100% of the color patch 30 of halftone dot percentages of C 100% and M 100%, from the standard density conditions, and the third term on the right side represents the difference of a spectral density produced by changing, under given changed density conditions, the density of only M 100% of the color patches 30 of halftone dot percentages of C 100% and M 100%, from the standard density conditions.

Therefore, the spectral density $D_{CM}$ caused when the densities of both the colors C, M are changed can be determined by adding each difference produced when one of the densities of the colors C, M is fixed and the other changed, to the standard spectral density $(D_{C(std)}+D_{M(std)})$ under the standard density conditions, as with the spectral reflectance $R_{CM}$. Unlike the equation (1) for determining the spectral reflectance $R_{CM}$, the spectral density $D_{CM}$ can be determined with high accuracy as the equation (3) is free of the term representing the error $\Delta R_C \cdot \Delta R_M$.

As a result, a target spectral density D at the time when C, M, M, K are changed to an arbitrary density under desired changed density conditions is highly accurately determined according to the following equation:

$$D = D_{std} + D_{\Delta C} + D_{\Delta M} + D_{\Delta Y} + D_{\Delta K} \quad (11)$$

based on the above equation (10), where $D_{std}$ represents a standard spectral density, $D_{\Delta C}$ a spectral density difference at the time the density of only C is changed, $D_{\Delta M}$ a spectral density difference at the time the density of only M is changed, $D_{\Delta Y}$ a spectral density difference at the time the density of only Y is changed, and $D_{\Delta K}$ a spectral density difference at the time the density of only K is changed.

As is the case with the determination of the target spectral reflectance R, the standard spectral density $D_{std}$ is replaced with a corrective standard spectral density which is a standard density, accurate spectral density differences $D_{\Delta C}$, $D_{\Delta M}$, $D_{\Delta Y}$, $D_{\Delta K}$ are calculated, and a print predicting profile 20 is determined from the corrective standard spectral density and the spectral density differences. The corrective standard spectral density and the spectral density differences are determined according to simultaneous equations established for each wavelength.

In the event that the color patches to be processed for calculating the target spectral density D are in three colors C, M, Y, it is desirable to calculate the target spectral density D with the spectral density difference $D_{\Delta K}$ being set to 0. Similarly, in the event that the color patches to be processed for calculating the target spectral density D are in two colors C, M, it is desirable to calculate the target spectral density D with the spectral density differences $D_{\Delta Y}$, $D_{\Delta K}$ being set to 0.

A print predicting profile 20 may be generated using calorimetric densities or calorimetric values rather than the spectral reflectances or spectral densities. Specifically, the colorimetric densities are determined according to simultaneous equations established for each of X, Y, and Z densities, and the calorimetric values are determined according to simultaneous equations established for each of calorimetric values X, Y, Z. The X, Y, and Z densities refer to densities with spectral sensitivities being represented by color-matching functions x(λ), y(λ), z(λ) (λ: wavelength).

In the above description, a print predicting profile 20 corresponding to density changes from the standard densities are determined. However, intermediate densities between the maximum and minimum densities of C, M, Y, K that can be printed by the printing press 14 may be set as standard densities, and a print predicting profile 20 may be generated based on a standard density color chart and a changed density color chart which have been generated according to the intermediate densities. The intermediate densities may be set as average values of the maximum and minimum densities or arbitrary values between the maximum and minimum densities.

Since the colors of the print P1 generated by the printing press 14 vary depending on the sheet of paper used for printing and the printing conditions including the inks, the dot gain, etc., the color converter 16 should desirably convert the image data in view of changes of the printing conditions.

Figure 10:
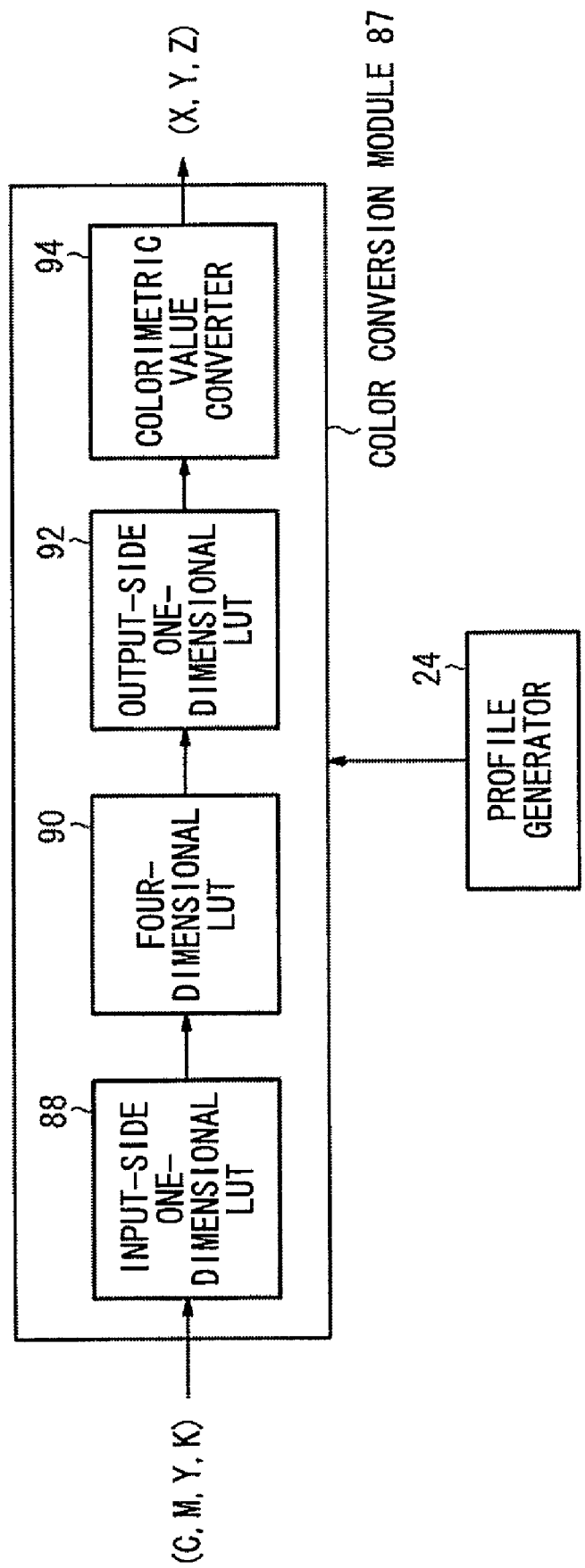
FIG. 10 is a block diagram of a modular configuration of the print predicting profile.

FIG. 10 shows a color conversion module 87, which serves as part of the color converter 16, for converting image data C, M, Y, K into calorimetric values X, Y, Z or the like using a print predicting profile 20 that is generated by the profile generator 24 based on the ICC. The color conversion module 87 comprises an input-side one-dimensional LUT (lookup table) 88 for converting the image data C, M, Y, K into image data C, M, Y, K which are accordance with a print predicting profile 20 and which reflect the printing condition of a dot gain, a four-dimensional LUT 90 for converting the image data C, M, Y, K into calorimetric values X, Y, Z or the like which are accordance with a print predicting profile and which reflect the printing condition of inks, an output-side one-dimensional LUT 92 for converting the calorimetric values X, Y, Z or the like into desired calorimetric values X, Y, Z or the like which are accordance with a print predicting profile, and a colorimetric value converter 94 for converting the colorimetric values X, Y, Z or the like into colorimetric values X, Y, Z or the like which are accordance with a print predicting profile and which reflect the printing conditions of a print sheet.

A process carried out by the color conversion module 87 when the print sheet is changed will be described below.

Colorimetric values output from the four-dimensional LUT 90 based on the print predicting profile according to the ICC specification are represented by relative values for equalizing the color of the print sheet to standard white. Specifically, the four-dimensional LUT 90 converts the image data C, M, Y, K of the print sheet (C=M=Y=K=0) into calorimetric values X, Y, Z of a standard light source (D50 light source) or converts the image data C, M, Y, K of the print sheet (C=M=Y=K=0) into calorimetric values L*=100, a*=b*=0.

The calorimetric value converter 94 converts the relative values, referred to above, into absolute values depending on the print sheet used, based on the calorimetric values X, Y, Z or the like (color information) of the print sheet according to the print predicting profile generated by the profile generator 24. Specifically, the absolute calorimetric values of the print sheet under the standard light source (D50 light source), for example, are determined from the relative calorimetric values supplied from the output-side one-dimensional LUT 92, the sheet colorimetric values of the print sheet under the standard light source (D50 light source) according to the print predicting profile, and the light source calorimetric values of the standard light source (D50 light source), as follows:

Absolute colorimetric values=relative calorimetric values×sheet calorimetric values÷light source colorimetric values.

If the colorimetric values that are input to the calorimetric value converter 94 are relative colorimetric values L*, a*, b*, then they are converted into relative calorimetric values X, Y, Z, which are then converted into absolute colorimetric values X, Y, Z according to the above equation.

When the inks used and the dot gain remain unchanged, it is possible to obtain colorimetric values X, Y, Z or the like depending on the print sheet, without the need to print a color chart C1, simply by giving the colorimetric values X, Y, Z or the like of the print sheet used as a print predicting profile. According to the ICC, the colorimetric values of the print sheet are given as media white point tags.

A process carried out by the color conversion module 87 when the dot gain is changed will be described below.

The dot gain varies when the blankets of the printing press 14 are deteriorated or replaced, and also varies depending on the temperature and humidity of the printing press 14. If the inks used remain unchanged, then it is possible to obtain image data C, M, Y, K in view of a variation of the dot gain by reflecting the variation of the dot gain in the input-side one-dimensional LUT 88.

Based on the relationship between one of the image data C, M, Y, K of the color chart C1 and one of the calorimetric values X, Y, Z or the like, the profile generator 24 generates image data C, M, Y, K after the dot gain has varied, as a print predicting profile, by printing and colorimetrically measuring the color chart C1 after the dot gain has varied, and corrects the input-side one-dimensional LUT 88 using the print predicting profile.

Figure 11:
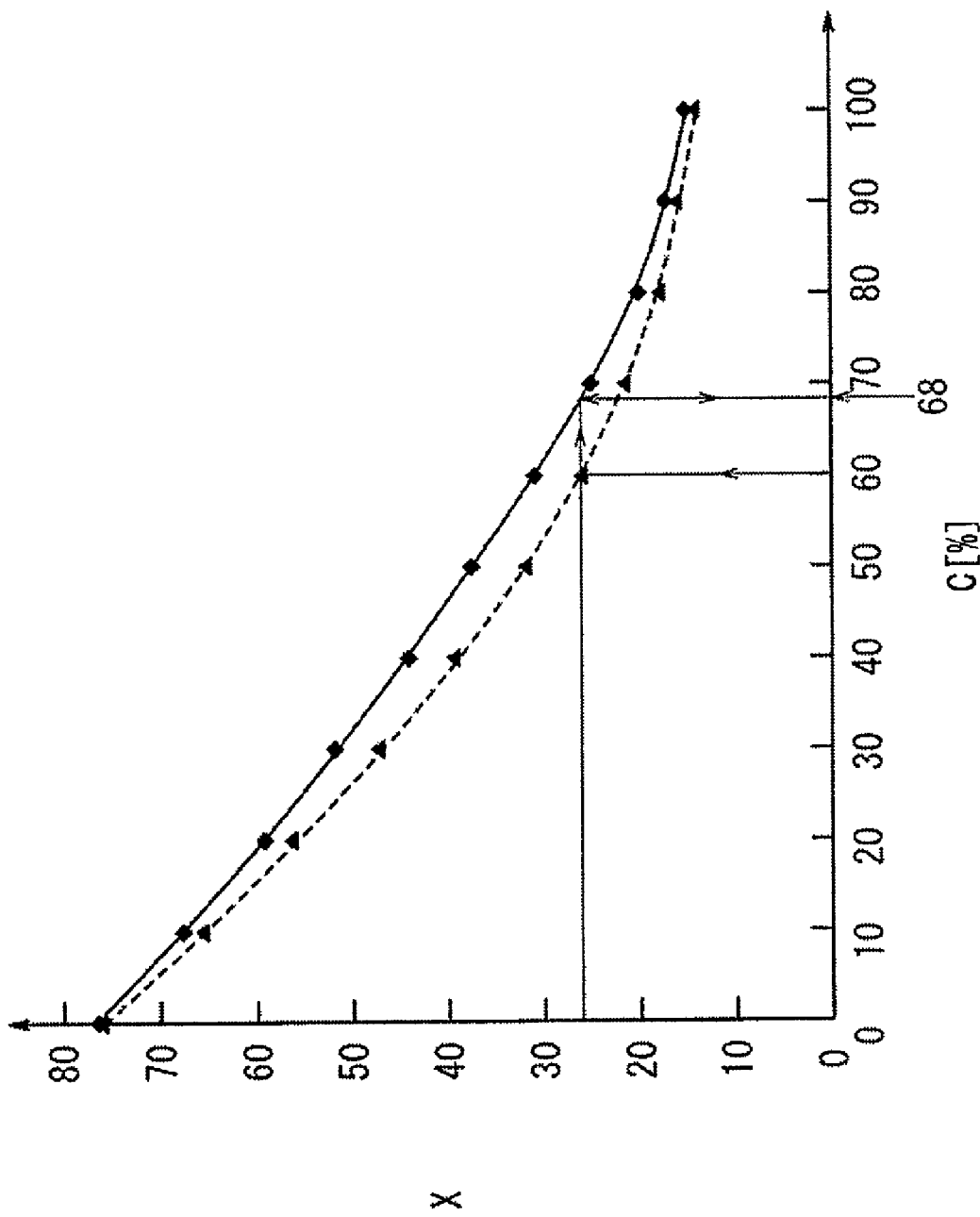
FIG. 11 is a diagram showing the relationship between the halftone dot % and calorimetric values X of image data C before and after the dot gain varies.

FIG. 11 shows the relationship between the halftone dot % and calorimetric values X of image data C before and after the dot gain varies. In FIG. 11, the solid-line curve represents the relationship before the dot gain varies, and the dotted-line curve the relationship after the dot gain varies. The dot gain does not vary if the halftone dot % is 0% or 100%. Any measurement errors can be minimized by selecting the image data C, M, Y, K and the calorimetric values X, Y, Z which undergo greatest changes. For example, it is preferable to select the relationship between the image data C and the calorimetric value X, the relationship between the image data M and the calorimetric value Y, the relationship between the image data Y (Yellow) and the calorimetric value Z, and the relationship between the image data K and the calorimetric value Y.

Figure 12:
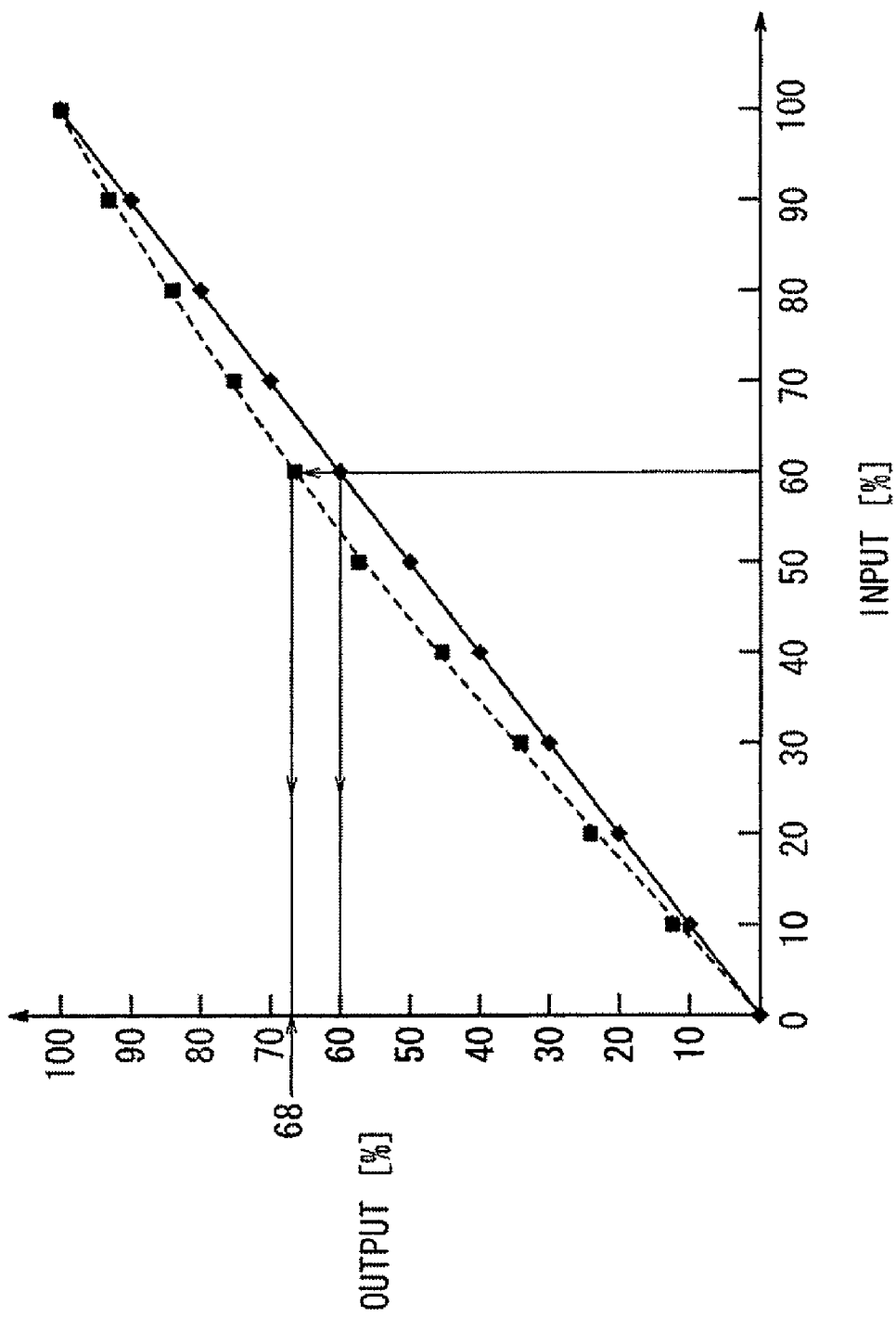
FIG. 12 is a diagram showing an input-side one-dimensional LUT.

For example, in FIG. 11, when the halftone dot % of the image data C is 60%, the halftone dot % of the image data C before the dot gain varies, for obtaining a calorimetric value X after the dot gain varies is 68%. Therefore, if the input-side one-dimensional LUT 88 is corrected to output the input image data C of 60% as image data C of 68%, then it is possible to obtain image data C taking into account the effect of the dot gain. FIG. 12 shows the input-side one-dimensional LUT 88 corrected based on these relationships. In FIG. 12, the solid-line curve represents the input-side one-dimensional LUT 88 before the dot gain varies, and the dotted-line curves the input-side one-dimensional LUT 88 after the dot gain varies.

A process carried out by the color conversion module 87 when the inks used are changed will be described below.

The printing press 14, which is set to the standard density conditions, prints a color chart C1, and calorimetric values, e.g., colorimetric values X, Y, Z, of the color chart C1 are measured by the calorimeter. The profile generator 24 determines the relationship of colorimetric values X1, Y1, Z1 to the image data C, M, Y, K of the color chart C1 as a print predicting profile. Then, after only the inks of the standard density conditions are changed, the profile generator 24 similarly determines the relationship of colorimetric values X2, Y2, Z2 to the image data C, M, Y, K of the color chart C1 as a print predicting profile.

Differences $\Delta X$, $\Delta Y$, $\Delta Z$ between the colorimetric values X1, Y1, Z1 and the colorimetric values X2, Y2, Z2 are determined, and the relationship between the differences $\Delta X$, $\Delta Y$, $\Delta Z$ and the image data C, M, Y, K is used as a differential lookup table. Using the differential lookup table, the profile generator 24 corrects a print predicting profile established under given density variation conditions, and generates a four-dimensional LUT 90 for converting the image data C, M, Y, K into calorimetric values X, Y, Z, using the corrected print predicting profile. Rather than correcting the print predicting profile, the profile generator 24 may correct calorimetric values X, Y, Z which are output values of the four-dimensional LUT 90 under the standard density conditions already generated.

In this manner, a desired four-dimensional LUT 90 can be produced simply by printing and colorimetrically measuring required minimum color charts C1. If both the inks and the print sheet are changed and the differences $\Delta X$, $\Delta Y$, $\Delta Z$ are determined, then it is possible to produce a four-dimensional LUT 90 taking into account both the inks and the print sheet.

Figure 13:
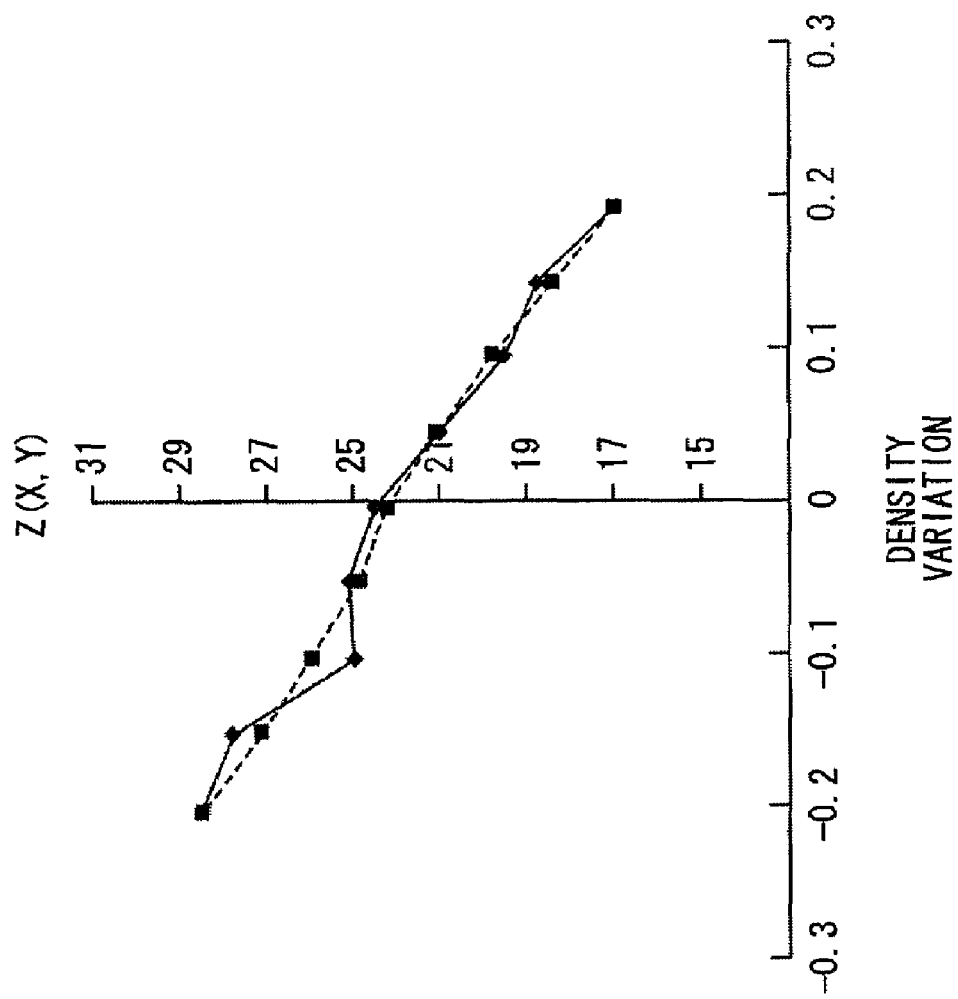
FIG. 13 is a diagram showing the relationship between density variations and colorimetric values.

Ideally, the calorimetric values of the color chart C1 that is calorimetrically measured by the calorimeter should vary monotonically with density variations, as indicated by the dotted-line curve in FIG. 13. Actually, the colorimetric values of the color chart C1 may be measured as greatly varied values as indicated by the solid-line curve in FIG. 13 because of variations of the printed state of the color chart C1 and measurement errors. Similarly, the colorimetric value differences may also be measured as greatly varied values as indicated by the solid-line curve in FIG. 14 though the differences should vary monotonically with density variations.

Preferably, the calorimetric values or the differences should be smoothed. The colorimetric values or the differences may be smoothed by averaging calorimetric values or differences which are adjacent to each other in the density varying direction, or interpolating adjacent calorimetric values or differences only in dada which are largely different from the monotonically varying data. The spectral reflectances or the spectral reflectance differences, the spectral densities or the spectral density differences, and the colorimetric densities or calorimetric density differences should also preferably be smoothed. The spectral reflectances, the spectral reflectance differences, the spectral densities, and the spectral density differences are smoothed for each wavelength.

The present invention is not limited to the illustrated embodiments, but may freely be changed or modified within the scope thereof.

For example, the print color predicting system 10 employs the printer 18 to generate the proof sheet P2. However, the print color predicting system 10 may employ a color monitor, for example, to display the proof sheet P2 thereon. In this case, the profile generator 24 calorimetrically measures the color chart C2 displayed on the color monitor, generates a monitor profile based on the obtained colorimetric values, and sets the monitor profile in the color converter 16.

The print predicting profile 20 may be generated with respect to an arbitrary number of colors, e.g., two or more colors, rather than the four colors C, M, Y, K.

The color materials for use on the print P1 are not limited to inks, but may be toners, for example.

Although certain preferred embodiments of the present invention have been shown and described in detail, it should be understood that various changes and modifications may be made therein without departing from the scope of the appended claims.

What is claimed is:

1. A method of predicting the colors of a print produced by a printing press, comprising the steps of:
   generating a standard density color chart with the printing press which is set to standard density conditions for producing the print of standard densities, and measuring the standard density color chart to determine standard measured values;
   generating a changed density color chart with the printing press which is set to changed density conditions in which the densities of color materials used to generate the print are individually changed by respective given amounts and the densities of other color materials than the color material with the changed density are fixed to the standard density conditions, and measuring the changed density color chart to determine changed measured values;
   determining monochromatic standard densities of the standard density color chart which is generated from the color materials;
   determining monochromatic changed densities of the changed density color chart which is generated from the color materials; and
   determining corrective standard measured values with respect to standard density setting values for the respective color materials which are set as the standard density conditions, and the differences between the corrective standard measured values and corrective changed measured values with respect to changed density setting values for the respective color materials which are set as the changed density conditions, according to a first relational expression of the corrective standard measured values and the differences which represent the standard measured values with respect to the monochromatic standard densities and a second relational expression of the corrective standard measured values and the differences which represent the changed measured values with respect to the monochromatic changed densities;
   whereby the colors of the print under desired changed density conditions are predicted using the corrective standard measured values and the differences.

2. A method according to claim 1, wherein the standard measured values are represented by the first relational expression in which the differences for each of the changed density setting values multiplied by a coefficient based on the differences between the monochromatic standard densities and the standard density setting values are added to the corrective standard measured values, and the changed measured values are represented by the second relational expression in which the differences for each of the changed density setting values multiplied by a coefficient based on the differences between the monochromatic changed densities and the changed density setting values are added to the corrective standard measured values.

3. A method according to claim 1, wherein the colors of the print are predicted based on values obtained by interpolating the differences with respect to the respective color materials according to the changed density setting values and adding the interpolated values and the corrective standard measured values to each other.

4. A method according to claim 1, wherein the corrective standard measured values and the differences are determined for each printing position on the standard density color chart and the changed density color chart.

5. A method according to claim 1, wherein the standard measured values and the changed measured values represent spectral reflectances.

6. A method according to claim 1, wherein the standard measured values and the changed measured values represent spectral densities.

7. A method according to claim 1, wherein the standard measured values and the changed measured values represent calorimetric densities.

8. A method according to claim 1, wherein the standard measured values and the changed measured values represent calorimetric values.

9. A print color predicting system for predicting the colors of a print produced by a printing press, comprising:
  a calculator for, based on standard measured values obtained by measuring a standard density color chart generated with the printing press which is set to standard density conditions for producing the print of standard densities, and changed measured values obtained by measuring a changed density color chart generated with the printing press which is set to changed density conditions in which the densities of color materials used to generate the print are individually changed by respective given amounts and the densities of other color materials than the color material with the changed density are fixed to the standard density conditions, determining corrective standard measured values with respect to standard density setting values for the respective color materials which are set as the standard density conditions, and the differences between the corrective standard measured values and corrective changed measured values with respect to changed density setting values for the respective color materials which are set as the changed density conditions, according to a first relational expression of the corrective standard measured values and the differences which represent the standard measured values with respect to monochromatic standard densities of the standard density color chart and a second relational expression of the corrective standard measured values and the differences which represent the changed measured values with respect to monochromatic changed densities of the changed density color chart;
  a storage unit for storing the corrective standard measured values and the differences;
  a setting unit for setting target densities for the respective color materials; and
  a generator for adjusting the corrective standard measured values with the differences for the color materials which are set to the target densities different from the standard densities, and generating a print predicting profile based on the relationship between data for generating the standard density color chart and the adjusted corrective standard measured values;
  whereby the colors of the print which is set to the target densities are predicted using the print predicting profile.

10. A print color predicting system according to claim 9, further comprising:
  an output profile for converting the predicted colors of the print which are calculated using the print predicting profile, into output data of an output device, wherein the output device outputs a proof for the print using the output profile.

11. A print color predicting system according to claim 9, wherein the generator adjusts the corrective standard measured values by adding thereto the differences for the color materials which are set to the target densities different from the standard densities.

12. A print color predicting system according to claim 9, wherein the generator adjusts the corrective standard measured values by interpolating the differences for the color materials according to the target densities and adding the interpolated values to the corrective standard measured values.

13. A print color predicting system according to claim 9, wherein the standard measured values and the changed measured values represent spectral reflectances.

14. A print color predicting system according to claim 9, wherein the standard measured values and the changed measured values represent spectral densities.

15. A print color predicting system according to claim 9, wherein the standard measured values and the changed measured values represent colorimetric densities.

16. A print color predicting system according to claim 9, wherein the standard measured values and the changed measured values represent colorimetric values.

17. A print color predicting system according to claim 9, wherein the generator corrects the print predicting profile based on color information of a print sheet for use in the print.

18. A print color predicting system according to claim 9, wherein the generator corrects the print predicting profile based on a change which occurs in the standard measured values before and after the dot gain of the printing press varies.

19. A print color predicting system according to claim 9, wherein the generator corrects the print predicting profile based on a change which occurs in the standard measured values before and after the color materials for producing the print change.

* * * * *